Nov. 19, 1963   F. T. CADMUS, JR   3,110,933
NAILER JOISTS
Filed Dec. 30, 1960   2 Sheets-Sheet 1
FIG. 1
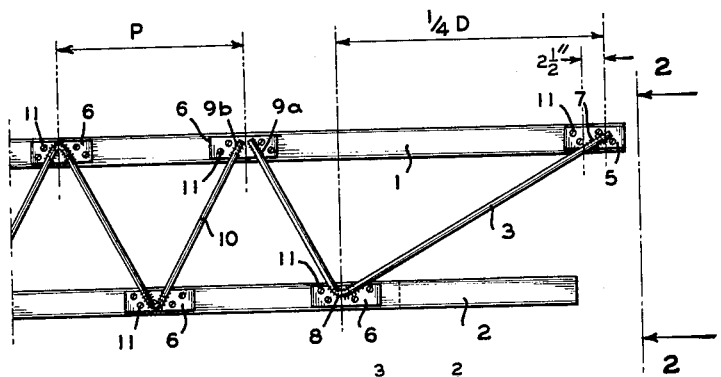
FIG. 2
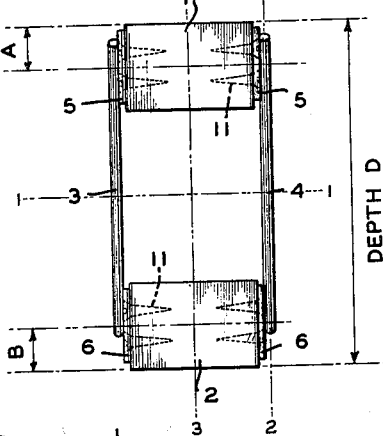
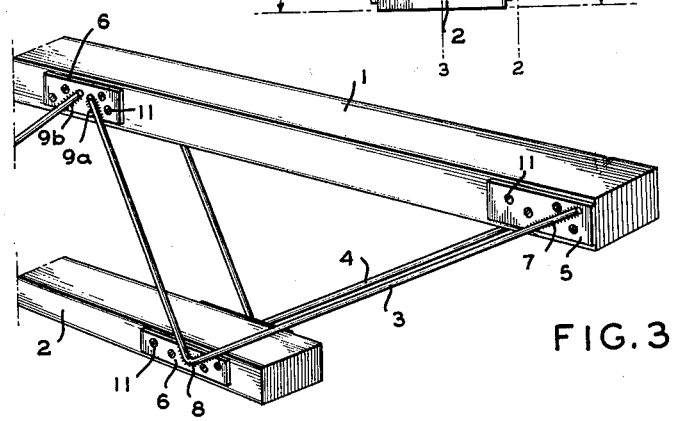
FIG. 3
INVENTOR
FRED T. CADMUS JR
BY *Abraham A. Saffitz*
ATTORNEY FIG. 4
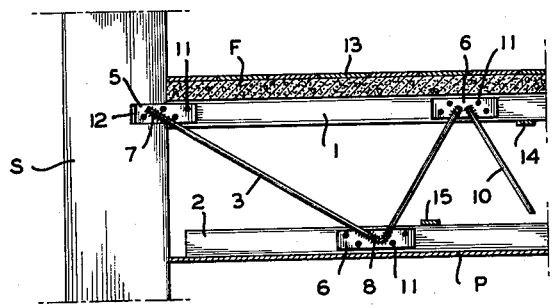
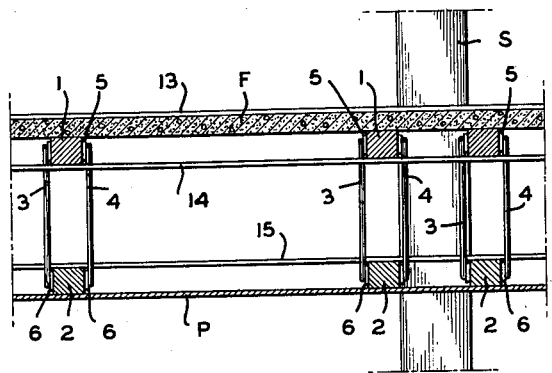
FIG. 5
INVENTOR
FRED T. CADMUS JR
BY *Abraham A. Saffitz*
ATTORNEY

3,110,933
NAILER JOISTS
Fred T. Cadmus, Jr., Alexandria, Va., assignor to Joists Inc., Alexandria, Va., a corporation of Virginia
Filed Dec. 30, 1960, Ser. No. 79,744
1 Claim. (Cl. 20—1)

This invention relates to nailer joists in which the upper and lower chords comprise uncovered, freely running timbers as the structural members of the joist, these timbers being of generally rectangular cross section and these upper and lower wooden chords respectively being connected together in vertically spaced relation by a bridging web formed of opposed pairs of connected continuously running V-shaped metal rods or bars which are joined by welding or brazing both at the vertex of the V-shape and at the divergent ends of the V-shape to flat side plates and these side plates being secured to sides of the wooden chord members. Effectively, three plates are used for each V-shaped rod, the plates being attached by bolting, screw threads or nailing to the opposite side surfaces of the freely running structural timber chords thereby leaving the wooden surface completely exposed on the top as well as substantially completely exposed at the sides of the timbers except for a small limited area where the side plates are attached.

In the preferred form of the invention, the metal bridging web members are constituted by a plurality of pairs of V-shaped metal rods or bars, forming a continuous zig-zag lattice at each side of the joist, each divergent upper end of the V-shaped rod being joined by welding to a generally rectangular shaped, flat, thin metal plate to the upper wood chord, the plate having a relatively small area which is just sufficient to provide a minimum area for face-to-face attachment of the plate to the chord side. Each vertex of the V-shaped rod member is joined by welding to a flat tin metal plate to a side of the lower chord, the plates also being of minimum area and of the same shape as the plate for the upper chord side attachment. Adjacent upper ends of successive V-rods are joined to a common upper chord plate to give the continuous zig-zag lattice plate which is welded to a V-shaped rod of the pair of rods in vertical and horizontal alignment by being placed in alignment with the corresponding plate for the V-shaped rod on opposite sides of the same chord in alignment and by being placed in horizontal alignment with successive plates on the same chord to maintain thereby the diagonal and each of the ends of the pairs of V-shaped rods in parallel relation and alignment on opposite sides of the upper and lower timber chords. In this manner, each of the flat plates in the nailing joist of the invention is one of a pair of plates which is used to maintain the convergent vertex and divergent ends of each rod in paired and parallel relation on opposite sides of the freely running timber chords. In this manner, the plates and rods, the only metal structure and constituting the web, forms continuous zig-zag V-members with diagonals formed by rods extending divergently downwardly and upwardly from the plates only on the opposite sides only of the timber chords.

Each of the plates provides welded anchorage for continuous zig-zag running diagonals along the entire running length of both timbers and rigidly maintain the rods in opposite parallel alignment. When viewed along the joist length, there will be seen a series of oppositely aligned plates and the leading upper plate at the forward or trailing end of the upper timber chord presents but a single terminated divergent end of the V-shaped diagonal rod member.

The intermediate plates attached to the side of the upper middle chord have the trailing divergent end of two rods wherein one V is welded in an inverted V relation to the leading divergent end of the antecedent V-shaped rod.

It is an advantage of the nailing joist of the invention that the upper and lower structural chord members are formed of almost completely uncovered structural wood members in continuous and free running length, the only iron or steel which is present being restricted to the pairs of side bridging V-shaped rods, each rod being in parallel alignment with the other rod of the pair and each rod being connected by welding to side plates which cover but a small part of the side surface only of the upper and lower timber chords.

Heretofore, composite steel and wood nailing joists have been fabricated of timbers and bridging metal in a zig-zag lattice form but these prior art structures have employed the steel material as an essential load bearing part of the upper and lower chords and have also used the steel material of these chords to cover a major part of top and/or bottom surface or both surfaces of the upper and lower chords. Effectively, the chord of the nailing joist in these prior art structures is fabricated partially of wood and partially of metal with the metal covering at least one entire side of the joist and a substantial part of the top of the chord. An example of this type of joist is shown in U.S. patent to Kullmer, No. 2,154,944, and employs continuous encasing channels of metal to embrace the sides and part of the top portions of the timber chords, both in top and bottom beams.

The free running uncovered wood chords in the joist of the present invention completely eliminates the metal channel covering for the chords in the patent to Kullmer. As a result the invention provides a structural nailing joist with all of the advantages of free running wooden top and bottom beams in rigid parallel load bearing relation, unencumbered by metal members. The nailer joist of the Kullmer patent, No. 2,154,944, is, in effect, a steel joist having hollow tubular metal upper and lower chords with continuous integral sheet metal bridging formed with triangular shaped openings while the present joist is more truly a wooden structure. The flat sheet metal web employed as bridging in patent to Kullmer is merely an extension of the sheet metal of the upper and lower chord channels in contrast to rod diagonals at the sides of the beams only in the present wooden nailer joist.

Normally in a conventional nailer joist of the type shown in Kullmer the wood is affixed to the steel load bearing joist by bolts so that it may be nailed as furring strips or studs to a partition or wall but the wood of the conventional nailer joist does no other work than to serve for nailing to another wooden or like member. In the present joist the wood actually does the load bearing work of the steel chords and the steel chords are completely eliminated, thereby saving 70% of the steel.

Accordingly, in the all wooden chord nailing joist of the present invention no timber fixing is necessary as the timber is already the essential and complete element of the main members of the joist. No end shoes are necessary as with steel nailer joists. In fact, end shoes would make it impractical for use with the conventional steel nailer joists which are meant to be top bearing. To attach an end shoe would make this purpose impossible.

In the present invention the joists may be made in all the standard depths as called for in the Steel Joist Institute, i.e., 8", 10", 12", 14", 16", 18", 20", 22", and 24".

As the joists get larger in size the size of the wood chords become larger just as in the case of steel joists where the steel in the top and bottom chords becomes larger in size.

foot which is given in the table below includes the plates, rods and lag screws or bolt accessories.

*Properties of Chords*

| Type | Nominal Depth "D," in. | Wood Top Chord | | | | | Wood Bottom Chord | | | "P," in. |
|---|---|---|---|---|---|---|---|---|---|---|
| | | Size in. | Area, in. | r Axis 4-4, in. | s Axis 3-3, in.³ | "A," in. | Size, in. | Area, in.² | "B," in. | |
| 8S2 | 8 | 2 x 4 | 5.89 | .47 | 1.60 | .813 | 2 x 4 | 5.89 | .813 | 14 |
| 10S2 | 10 | 2 x 4 | 5.89 | .47 | 1.60 | .813 | 2 x 4 | 5.89 | .813 | 14 |
| 10S3 | 10 | 2 x 5 | 7.52 | .47 | 2.03 | .813 | 2 x 5 | 7.52 | .813 | 18 |
| 10S4 | 10 | 3 x 4 | 9.52 | .98 | 4.16 | 1.313 | 3 x 4 | 9.52 | 1.313 | 18 |
| 12S3 | 12 | 3 x 4 | 9.52 | .98 | 4.16 | 1.313 | 3 x 4 | 9.52 | 1.313 | 18 |
| 12S4 | 12 | 3 x 5 | 12.14 | .98 | 5.31 | 1.313 | 3 x 5 | 12.14 | 1.313 | 18 |
| 12S6 | 12 | 4 x 6 | 20.39 | 1.35 | 12.32 | 1.813 | 4 x 6 | 20.39 | 1.813 | 18 |
| 14S4 | 14 | 3 x 4 | 9.52 | .98 | 4.16 | 1.313 | 3 x 4 | 9.52 | 1.313 | 18 |
| 14S6 | 14 | 3 x 6 | 14.77 | .98 | 6.45 | 1.313 | 3 x 6 | 14.77 | 1.313 | 18 |
| 14S7 | 14 | 4 x 6 | 20.39 | 1.35 | 12.32 | 1.813 | 4 x 6 | 20.39 | 1.813 | 18 |
| 16S5 | 16 | 3 x 5 | 12.14 | .98 | 5.31 | 1.313 | 3 x 5 | 12.14 | 1.313 | 18 |
| 16S6 | 16 | 3 x 6 | 14.77 | .98 | 6.45 | 1.313 | 3 x 6 | 14.77 | 1.313 | 18 |
| 16S8 | 16 | 4 x 7 | 24.02 | 1.35 | 14.53 | 1.813 | 4 x 7 | 24.02 | 1.813 | 18 |
| 18S6 | 18 | 3 x 6 | 14.77 | .98 | 6.45 | 1.313 | 3 x 6 | 14.77 | 1.313 | 20 |
| 18S7 | 18 | 4 x 6 | 20.39 | 1.35 | 12.32 | 1.813 | 4 x 6 | 20.39 | 1.813 | 20 |
| 18S8 | 18 | 4 x 7 | 24.02 | 1.35 | 14.53 | 1.813 | 4 x 7 | 24.02 | 1.813 | 20 |
| 20S6 | 20 | 3 x 6 | 14.77 | .98 | 6.45 | 1.313 | 3 x 6 | 14.77 | 1.313 | 22 |
| 20S7 | 20 | 4 x 6 | 20.39 | 1.35 | 12.32 | 1.813 | 4 x 6 | 20.39 | 1.813 | 22 |
| 20S8 | 20 | 4 x 7 | 24.02 | 1.35 | 14.53 | 1.813 | 4 x 7 | 24.02 | 1.813 | 22 |
| 22S7 | 22 | 4 x 6 | 20.39 | 1.35 | 12.32 | 1.813 | 4 x 6 | 20.39 | 1.813 | 24 |
| 22S8 | 22 | 4 x 7 | 24.02 | 1.35 | 14.53 | 1.813 | 4 x 7 | 24.02 | 1.813 | 24 |
| 24S8 | 24 | 4 x 7 | 24.02 | 1.35 | 14.53 | 1.813 | 4 x 7 | 24.02 | 1.813 | 24 |

| Type | 2 Rounds Web End Section | | | 2 Rounds Web Middle Section | | | Moment of Inertia Axis 1—1, in.⁴ | Joist Properties | | Approx. Weight per Foot lbs. |
|---|---|---|---|---|---|---|---|---|---|---|
| | Diam. W, in. | Total Area, in.² | r Axis 2—2, in. | Diam. W, in. | Total Area, in.² | r Axis 2—2, in. | | Resist Moment, in.-lb. | End Reaction, lbs. | |
| 8S2 | ⅜ | .221 | .094 | ⅜ | .221 | .094 | 188 | 55,000 | 2,000 | 4.0 |
| 10S2 | 7/16 | .301 | .109 | 7/16 | .301 | .109 | 250 | 60,000 | 1,900 | 4.0 |
| 10S3 | 7/16 | .301 | .109 | 7/16 | .301 | .109 | 314 | 75,000 | 2,000 | 4.5 |
| 10S4 | 7/16 | .301 | .109 | 7/16 | .301 | .109 | 351 | 105,000 | 2,200 | 7.0 |
| 12S3 | 7/16 | .301 | .109 | 7/16 | .301 | .109 | 446 | 89,000 | 2,000 | 6.0 |
| 12S4 | 7/16 | .301 | .109 | 7/16 | .301 | .109 | 568 | 114,000 | 2,100 | 8.0 |
| 12S6 | 7/16 | .301 | .109 | ½ | .393 | .125 | 852 | 170,000 | 2,600 | 13.0 |
| 14S4 | ½ | .393 | .125 | ½ | .393 | .125 | 619 | 133,000 | 2,400 | 6.0 |
| 14S6 | ½ | .393 | .125 | 9/16 | .497 | .140 | 960 | 206,000 | 3,000 | 10.0 |
| 14S7 | ½ | .393 | .125 | 9/16 | .497 | .140 | 1,100 | 236,000 | 3,200 | 14.0 |
| 16S5 | ½ | .393 | .125 | 9/16 | .497 | .140 | 1,095 | 192,000 | 2,900 | 8.0 |
| 16S6 | ½ | .393 | .125 | 9/16 | .497 | .140 | 1,325 | 232,000 | 3,200 | 10.0 |
| 16S8 | ½ | .393 | .125 | ⅝ | .614 | .156 | 1,850 | 346,000 | 3,900 | 16.0 |
| 18S6 | 9/16 | .497 | .140 | ⅝ | .614 | .156 | 1,758 | 273,000 | 3,600 | 11.0 |
| 18S7 | 9/16 | .497 | .140 | ⅝ | .614 | .156 | 2,120 | 330,000 | 3,800 | 15.0 |
| 18S8 | 9/16 | .497 | .140 | 11/16 | .742 | .172 | 2,500 | 376,000 | 4,000 | 17.0 |
| 20S6 | 9/16 | .497 | .140 | 11/16 | .742 | .172 | 2,225 | 290,000 | 3,600 | 11.0 |
| 20S7 | 9/16 | .497 | .140 | 11/16 | .742 | .172 | 2,725 | 354,000 | 3,800 | 15.0 |
| 20S8 | 9/16 | .497 | .140 | ¾ | .884 | .187 | 3,216 | 417,000 | 4,100 | 17.0 |
| 22S7 | ⅝ | .614 | .156 | ¾ | .884 | .187 | 3,450 | 376,000 | 3,800 | 16.0 |
| 22S8 | ⅝ | .614 | .156 | ¾ | .884 | .187 | 4,060 | 344,000 | 4,200 | 18.0 |
| 24S8 | ⅝ | .614 | .156 | ¾ | .884 | .187 | 5,000 | 500,000 | 4,500 | 18.0 |

Since architects throughout this country base their designs on the depth of the joist being held to sizes above, A 2½" top bearing and the joist of each depth carrying the load intended is as shown in the Steel Joist Institute tables.

In the table indicated below there are listed the properties of chords of the nailer joists of the invention, reference being made to FIG. 1 of the drawings for the axis locations and chord dimensions which are set forth in the columns of the table. The value of moment of inertia is for the chords only. The average weight per foot which is given in the table below includes the plates, rods and lag screws or bolt accessories.

An object of the invention is to provide a nailer joist having uncovered load bearing timbers as the continuous free running upper and lower chords of a nailer joist provided with a novel bridging web formed in zig-zag V-shaped diagonals from a plurality of aligned opposed pairs of V-shaped metal rods on opposite sides of said chords extending short of the upper and lower surface of said joists, a plurality of flat thin metal plates in pairs to provide welded anchorage for said V-shaped rods, each flat thin plate of said pair being of minimum area, aligned in opposition to the other plate of said pair and the plates being located at the divergent and convergent ends of the V-shaped rods at the upper and lower chords thereby providing welding attachment of three plates for each extremity of the V-shaped rod diagonals on each side of said joist, said plates on each side of said joist being in fixed horizontal alignment along a straight line and being in fixed paired alignment on opposite sides of said joist to maintain each diagonal web of the V in substantially the same plane on each side of the joist and to maintain each diagonal of each pair of V members in parallel alignment across opposite sides of the joist thereby adapting the rigid joist for nailing directly at studs and laths to any surface of top and bottom wood chords and to completely eliminate end shoes and caps when fixed to load supporting posts and beams.

A further object of the invention is to provide zig-zag V-shaped metal diagonals of bridging chord on either side of said upper and lower wooden chords which are each formed of one piece zig-zag running rod members welded to the plates at the extremities of the V-shaped rod members.

A still further object of the invention is to provide a novel all wooden chord nailer joist which obviates the need for attachment of straight metal elements for additional structural strength, such as rods, angle irons, T-irons, plates or end shoes but instead uses continuous lumber elements instead of straight metal elements and a novel bridging element threadedly attached directly to the lumber to thereby replace any and all steel in what is known as the top and bottom chords of the joist.

A still further object of the invention is to provide novel combinations of the nailer joist with wood stud and wood lath which can be nailed directly to top and bottom chords of the nailer joist while eliminating the necessity of any welding in the field, when erecting structures using the nailer joist of the invention.

The invention includes the several steps of assembly and manufacture of the novel all wooden joist and novel zig-zag rod lattice with plates forming the bridging web members on opposite sides of the uncovered running timbers.

Other and further objects of the invention will appear from the detailed description below, it being understood that this description is given by way of illustration and explanation only, not by way of limitation, since various changes may be made by those skilled in the art without departing from the scope and spirit of the invention. In connection with the more detailed description there is shown in the drawings, in FIG. 1, a fragmentary side elevation of one embodiment of nailer joist of the invention; in FIG. 2, a vertical section through line 2—2 the joist of FIG. 1; in FIG. 3, a fragmentary perspective view of another embodiment of the joist of the invention showing a different zig-zag lattice; in FIG. 4, a fragmentary side elevation view, partly in section showing adaptation of the nailer joist of the invention for joining to a stud supporting a mastic floor and plaster ceiling with aid of lath; and in FIG. 5, an end view of a plurality of joists of the invention to show a preferred arrangement for joining to a stud and for supporting of concrete floor and plaster ceiling with aid of lath.

The all wooden joist illustrated in FIGS. 1, 2 and 3 comprises continuously free running uncovered timbers 1 and 2 constituting the wooden upper and lower chords of the joist which are held in rigid spaced apart relation by the bridging web consisting of flat thin metal plates 5 shown in an aligned horizontal series on the upper timber chord 1 and the same type of plates 6 on the lower timber chord 2 and V-shaped metal rod members attached at each divergent end to each plate 5 on the upper chord and attached at the vertex to each plate 6 on the lower chords on both sides of the upper and lower chords. Each metal plate 5 is the same and is preferably identical in shape and dimensions to each plate 6, the plates being provided with perforations, suitably spaced and preferably four in number for insertion of lag screws 11, or if desired under extreme circumstances through bolts (not shown) whereby the plates are rigidly secured to the sides only of the upper and lower beams at both sides thereof (see FIG. 2).

In all of the embodiment shown in FIGS., all upper plates 5 lie in a straight line along the upper chord 1, all lower plates 6 lie in a straight line along lower chord 2, these two straight lines lie in the same plane, the upper plates being opposite each other and the lower plates being opposite each other. Upper and lower chords respectively are also in alignment so that the diagonals formed by the V-shaped metal rod portions 3 and 4 as shown in FIG. 3 are parallel to each other from the upper leading divergent end to the vertex and from the vertex to the upper trailing divergent end of these V-shaped rods 3 and 4 forming the forward pair of rods at the head of the joist. Whether the V-rod members of the pair are formed each as a separate V-shaped element 3 and 4 as shown in FIG. 3 or as a continuous zig-zag running V and inverted V rod element 10 as shown in FIG. 1 to the left of the leading single V element 3 the parallel relation of diagonals in each opposite paired V portion is maintained in the manner shown in FIG. 3 for the lead pair of V-shaped rod elements 3 and 4. The fixed rigid relation of V-rod elements 3, 4 and 10 in the embodiments all comprising the zig-zag lattice work between the upper and lower plates 5 and 6 in horizontal series is achieved by welding as shown by the weld fillets 7 at the head end of the joist on plate 5 at the free upper leading end of V-shaped element 3 in FIG. 3 and by weld fillets 8 above and below the vertex of element 3 on plate 6 on the lower chord. The weld fillets 9 are shown at the trailing free end of the V-shaped element 3 on the adjacent plate 6 on the upper chord immediately behind the plate at the leading end. This adjacent plate is characterized by having weld fillets on opposite sides of the vertex of the rod, e.g., weld fillets 9a for trailing end of V-rod 3 and weld fillets 9b for forward adjacent leading end of the V-rod 11 immediately behind V-rod 3, these respective ends forming the vertex shown on upper plate 6 in FIG. 3.

There is no substantial distinction between fillets 9a, 9b on plate 6 on upper chord and fillets 8 on plate 6 on the lower chord in FIG. 3 except for the discontinuous free ends of the V-rod 3 as compared to the continuously running zig-zag exemplified by running V and inverted V element 10 in FIG. 1. In view of the lead plates 5 and plates 6 being paired on opposite sides of the joist as shown in FIGS. 2 and 3, each opposite plate of the pair being welded in substantially identical fashion to the V extremities of V members 3, 4 or 10 or any combination of these in the web, the rigidity of the joist structure coupled with relative lightness of weight will be appreciated.

In the embodiment of FIG. 1 an end bearing of 2½ inches is shown in the drawing to illustrate conformity with architectural specifications. As shown in the table various standard timber sizes provide for extremely favorable joist properties in terms of resistance moment and end reaction while the weight per foot is not less favorable than lightweight reinforced steel joist of comparable construction but containing no wooden elements.

As shown in FIG. 4 the end bearing of 2½ inches is adapted to be inserted into the 4 inch minimum bearing depth recess 12 in stud S used as vertical load bearing support and illustrative of use with any vertical post, beam or the like. The advantages of the all wooden joist construction of the invention are illustrated in FIG. 4 for the case of poured mastic floor F and covering 13 of wood or tile which is laid directly over the joist and is further shown for the spaced joists in end view in FIG. 5 for a typical case of 24 inch centers. Nailing to the decking and the chords of the joist is permitted at any surface because of the fact that only a minimum area of flat plate 5 or flat plate 6 is used for securing the bridging web members. For conventional ⅜" rod this minimum plate area of identical plates 5 or 6 is so minor that no practical resistance to nailing is encounterd for any of the structural uses of the all wooden joist.

The all wood joist load bearing construction of the present invention is adapted for application of a plaster ceiling as shown by the ceiling P made of plaster and applied to the under surface of lower chord 2 which is made of wood. The embodiment which is shown in FIGS. 4 and 5 illustrates the poured mastic floor F which is placed on a subfloor on the upper chord 1 and the ceiling P which is placed on a support below lower wooden chord 2 in the same embodiment.

In the commonly used sizes of timber shown in the table, 2" x 4" up to 3" x 6", resistance moments of 55,000 inch pounds to 290,000 inch pounds are sufficient for most structural uses at relatively light weight and the end reaction varies from 2000 pounds up to about 4000 pounds. With the ready availability of lumber in these standard sizes, assembly at the construction site is easily carried out using the prefabricated bridging web members of metal supplied by the manufacturer and locally available lumber.

Only ordinary carpentry skill is required. The saving in freight is considerable and the fitting of the joist can be made with great precision to meet the most exacting architectural specifications without departing from ordinary carpentry skill. The fact that welding operations are completely eliminated in the field assures complete uniformity and reliability of the all wooden joist. Particularly in underdeveloped areas where wood is plentiful, labor is cheap, but still is short, the all wooden joist of the invention encourages the construction of sound multi-story wooden structures which would be prohibitively expensive due to the cost of all steel joists.

Having thus disclosed the invention what is claimed is as follows:

A nailer joist consisting essentially of upper and lower uncovered, free-running timbers of generally rectangular cross section, constituting the upper and the lower chords respectively of the joist; a continuous horizontally running bridging web in fixed and rigid connection to each side of the upper and lower chords, each of said bridging webs consisting of a plurality of zig-zag V-shaped metal rods having divergent ends and a vertex, said rods being aligned and joined on opposite sides of the upper and lower chords, said V-shaped rods terminating at the top end short of the extreme upper surface at the side of the upper chord and at the extreme bottom surface short of the extreme lower surface at the side of the lower chord; flat, thin metal plates rigidly secured within the confines of the sides of the upper free-running timber and of the lower free-running timber to provide upper plates and lower plates respectively, each of the upper and lower plates being of small area for encompassing the diametrically opposed ends of said web, the upper plates on the upper chord being positioned in staggered relation to the lower plates on the lower chord, and each of the plates on the side of the same chord being in horizontal alignment, and each of the divergent ends of said V-shaped rods being welded to the upper plates of the upper free-running timber while each vertex of the V-shaped rod is welded to the staggered adjacent lower plate of the lower free-running timber and the divergent ends of adjacent V-shaped rods are welded to a single plate whereby three plates consisting of two upper and one lower plate are provided for welding attachment of each V-shaped rod on each side of the joist, and the plates maintaining each bridging web in the same plane with diagonals of the V members being generally parallel to each other on the opposite sides of the chords, the free-running timbers being adapted for nailing directly to studs and laths while eliminating end shoes and caps.

References Cited in the file of this patent
UNITED STATES PATENTS

| 93,646 | Smith | Aug. 10, 1869 |
| 1,405,889 | Barling | Feb. 7, 1922 |
| 1,619,300 | Klaasen | Mar. 1, 1927 |
| 2,092,988 | Shodron | Sept. 14, 1937 |
| 2,300,113 | Faber | Oct. 27, 1942 |
| 2,421,197 | Green | May 27, 1947 |
| 2,459,037 | McIntosh | Jan. 11, 1949 |
| 2,727,281 | Cruciani | Dec. 20, 1955 |
| 2,996,160 | Voight | Aug. 15, 1961 |

FOREIGN PATENTS

| 169,601 | Great Britain | 1921 |
| 654,048 | Germany | 1937 |
| 1,100,070 | France | 1955 |
| 1,238,646 | France | July 4, 1960 |